United States Patent [19]
Lee

[11] Patent Number: 5,886,756
[45] Date of Patent: Mar. 23, 1999

[54] LIQUID CRYSTAL DISPLAY DEVICE

[75] Inventor: Young-Keun Lee, Seongnam, Rep. of Korea

[73] Assignee: Hyundai Electronics Industries Co., Ltd., Kyoungki-do, Rep. of Korea

[21] Appl. No.: 998,532

[22] Filed: Dec. 26, 1997

[30] Foreign Application Priority Data

Dec. 30, 1996 [KR] Rep. of Korea ............... 96-77739

[51] Int. Cl.$^6$ ................ G02F 1/1343; G02F 1/1335
[52] U.S. Cl. ................ 349/39; 349/106; 349/143
[58] Field of Search ................ 349/39, 106, 143, 349/43, 141

[56] References Cited

U.S. PATENT DOCUMENTS

| | | | |
|---|---|---|---|
| 5,159,476 | 10/1992 | Hayashi | 359/54 |
| 5,394,258 | 2/1995 | Morin et al. | 359/59 |
| 5,523,865 | 6/1996 | Furuta et al. | 359/59 |
| 5,696,566 | 12/1997 | Kim et al. | 349/39 |
| 5,760,854 | 6/1998 | Ono et al. | 349/38 |
| 5,796,448 | 8/1998 | Kim | 349/39 |

*Primary Examiner*—William L. Sikes
*Assistant Examiner*—Tiep H. Nguyen
*Attorney, Agent, or Firm*—Ware, Fressola, Van Der Sluys & Adolphson LLP

[57] ABSTRACT

Disclosed is a liquid crystal display device comprising a pair of facing substrates; a plurality of thin film transistors formed on one of the facing substrates; a plurality of pixel electrodes driven according to the actuation of the thin film transistors. The present invention provides a liquid crystal display device comprising a lower substrate; a plurality of gate bus lines formed on the lower substrate and to which selecting signals are applied parallel to each other; a plurality of common electrodes formed on the lower substrate; a plurality of thin film transistors connected to the gate bus lines and the common electrodes respectively; a plurality of pixel electrodes formed on the lower substrate and to which voltage signals from the common electrodes are applied in accordance with action of the thin film transistors; an upper substrate disposed oppositely to the lower substrate; a plurality of data bus lines formed on the upper substrate parallel to each other and to which image signals are applied; a plurality of color filters formed on the upper substrate above the data bus lines; and a plurality of transparent electrodes arranged on top of the color filters such that they are in contact with the data bus lines.

20 Claims, 4 Drawing Sheets

LIQUID CRYSTAL DISPLAY DEVICE

BACKGROUND OF THE INVENTION

1. Field of the Invention

The present invention relates to a liquid crystal display device, and more specifically to a liquid crystal display device comprising a pair of substrates opposed to each other, a plurality of thin film transistors formed on one of the substrates, and a plurality of pixel electrodes driven according to the action of the thin film transistors.

2. Description of the Related Art

Liquid crystal display devices are widely used in TVs, and graphic displays. One of these liquid crystal display devices is an active matrix type liquid crystal display device which has high response speed, and many pixel electrodes. Also, active researches are in progress toward active matrix type liquid crystal display devices with higher picture quality, larger size, and color display.

In the active matrix type liquid crystal display devices, gate bus lines and data bus lines are arranged on a lower substrate. At the intersections of the gate bus lines and data bus lines, pixel electrodes and switching devices such as diodes or transistors are arranged.

Since a drive of the pixel electrodes are controlled independently by the switching devices, their high speed driving is possible, and equipping a large number of pixels and realizing large size display therein are also possible.

In a conventional active matrix type liquid crystal display device as shown in FIG. 1, a plurality of gate bus lines 2 are arranged in a first direction P, parallel to each other on a lower substrate 1. Each of gate electrodes 2A is a part of respective gate bus lines 2, wherein the gate lines 2 each is protruded perpendicularly from a predetermined location of the respective gate bus lines 2. An amorphous silicon layer 4 is arranged on top of surface the gate electrodes 2A. A plurality of data bus lines 7 are arranged in a second direction Q is perpendicular to the gate bus lines 2, parallel to each other, so as to form a matrix shape of unit cells along with the gate bus lines 2. The gate bus lines 2 and the data bus lines 7 have a gate insulation layer (not shown) interposed between them so as to be electrically insulated from each other. Each of source electrodes 7A is a part of their respective data bus lines 7, and is protruded by a predetermined distance to be overlapping with one side of the amorphous silicon layer 4. Each of drain electrode 7B overlaps with the other side of the amorphous silicon layer 4. A plurality of thin film transistors TFT comprise the gate electrodes 2A, the amorphous silicon layer 4, the source electrodes 7A and the drain electrodes 7B. A plurality of pixel electrodes 8 are arranged inside their respective unit cells, and contact with the drain electrodes 7B. Storage electrodes 2B are disposed beneath the pixel electrodes 8, forming storage capacitors therewith. The storage electrodes 2B are made of non-transparent material.

As shown in FIG. 2, an upper substrate opposite to the lower substrate 1 includes a plurality of color filters 11 having the same shape as the pixel electrodes 8 on the lower substrate 1 so as to correspond with the same. A black matrix 12 is arranged to surround the respective outer portions of the color filters 11 to prevent scattering of colors of the color filters 11, and to prevent leakage of light from the lower substrate 1. The black matrix 12 is made of a non-transparent material. A transparent electrode (not shown) is coated over the color filters 11 and the black matrix 12, and is electrically grounded along with the storage electrodes 2B.

In the liquid crystal display having a structure as described above, if a scanning selecting signal is applied to one of the gate bus lines 2, and an image signal is transmitted to a corresponding data bus line 7, thin film transistors TFT located at the intersection of the data bus line 7 and the gate bus line 2 to which the scanning selecting signals were applied are turned on, and the corresponding pixel electrode 8 is driven. Then the image signal loaded into the data bus lines 7 flows from the source electrodes 7A to the drain electrodes 7B and is then applied to the pixel electrodes 8 being in contact with drain electrodes 7B, thereby driving the pixel electrodes 8.

In a result, a predetermined electric field is formed between the pixel electrodes 8 and the grounded transparent electrodes (not shown), and the liquid crystal molecules are activated. However, at intersections(shown as X in FIG. 1) of the gate bus lines 2 and a data bus lines 7, the foregoing liquid crystal display devices have a gate insulation film(not shown) disposed only between the gate bus lines 2 and the data bus lines 7. Hence, if a slight damage should arise at these gate insulation film, short circuit between gate bus lines 2 and data bus lines 7 is apt to happen.

Also, as the intersections of gate bus lines 2 and data bus lines 7, and data bus lines 7 and storage electrodes 2B increase, parasitic capacitance also increases. This causes the signal delay time T=RC to increase. Moreover, since the storage electrodes 2B are formed on the surfaces of the pixel electrodes 7, the transmitting area of light is blocked. Hence aperture ratio of the liquid crystal displays is reduced.

SUMMARY OF THE INVENTION

The object of the present invention is therefore to provide a liquid crystal display device capable of preventing short circuit between gate bus lines and data bus lines. Also, other object of the present invention is to provide a liquid crystal display device capable of reducing parasitic capacitance by minimizing the number of intersections between metal wirings.

Also, another object of the present invention is to provide a liquid crystal display device capable of increasing aperture ratio.

To accomplish the above objects, the present invention in one aspect thereof provides a liquid crystal display device comprising: a lower substrate; a plurality of gate bus lines formed on the lower substrate and to which selecting signals are applied parallel to each other; a plurality of common electrodes formed on the lower substrate; a plurality of thin film transistors connected to the gate bus lines and the common electrodes respectively; a plurality of pixel electrodes formed on the lower substrate and to which voltage signals from the common electrodes are applied in accordance with an action of the thin film transistors; an upper substrate disposed oppositely to the lower substrate; a plurality of data bus lines formed on the upper substrate parallel to each other and to which image signals are applied; a plurality of color filters formed on the upper substrate above the data bus lines; and a plurality of transparent electrodes arranged on top of the color filters such that they are in contact with the data bus lines.

Moreover, the present invention in other aspect thereof provides a liquid crystal display device comprising a lower substrate; a plurality of gate bus lines formed on the lower substrate parallel to each other, separated from each other by a predetermined distance and to which a cell selecting signal is applied; a plurality of common electrodes formed on the lower substrate, and arranged parallel to and between the gate bus lines; a plurality of storage electrodes protruded from the common electrodes toward the gate bus lines in parallel to each other, and separated by a predetermined distance from each other, the storage electrodes each being arranged inside every unit cell; a plurality of thin film transistors connected with the storage electrodes and the gate bus lines respectively; a plurality of pixel electrodes each connected to the respective thin film transistors so as to receive voltage signals from the common electrodes, the pixel electrodes being overlapped with a predetermined part of the storage electrodes; an upper substrate opposite the lower substrate; a plurality of data bus lines formed on the upper substrate, and arranged parallel to each other and perpendicularly to the gate bus lines; a plurality of color filters formed on the upper substrate above the data bus lines; and a plurality of transparent electrodes formed on top of the color filters, and being in contact with the data bus lines.

Furthermore, the present invention in another aspect thereof provides a liquid crystal display device comprising a lower substrate; a plurality of gate bus lines arranged parallel to and separated from each other by a predetermined distance, formed on the lower substrate, the gate bus lines each having a gate electrode protruded perpendicularly to the gate bus line to which cell selecting signals are applied; a plurality of common electrodes formed on the lower substrate, and arranged parallel to and between the gate bus lines; a plurality of storage electrodes protruded parallel toward the one side of the gate bus lines from the common electrodes, and separated by a predetermined distance from each other, the storage electrodes each being arranged inside every unit cell; a plurality of thin film transistors connected to the gate bus lines and the storage electrodes respectively, the thin film transistors each having the gate electrode, an amorphous silicon layer formed on the gate electrode, a source electrode overlapping with a predetermined portion of the amorphous silicon layer and connected with the respective storage electrodes, and a drain electrode connected with the other side of the amorphous silicon layer; a plurality of pixel electrodes each connected to the drain electrode, and overlapping with a predetermined part of the storage electrodes; an upper substrate opposite the lower substrate; a plurality of data bus lines formed on the upper substrate and arranged perpendicularly to the gate bus lines, the data bus lines each having a protruded portion extended in a perpendicular direction to the data bus lines at a location corresponding to the gate bus lines and the common electrodes; a plurality of color filters formed on the upper substrate above the data bus lines; and a plurality of transparent electrodes arranged on top of the color filters, such that they overlap with both side edges of a pair of data bus lines arranged parallel and adjacent to the transparent electrodes, and are connected with one of the protruded portions of the pair of data lines.

DETAILED DESCRIPTION OF THE INVENTION

A more specific description of a preferred embodiment of the present invention is given below with reference to the drawings.

Figure 1:
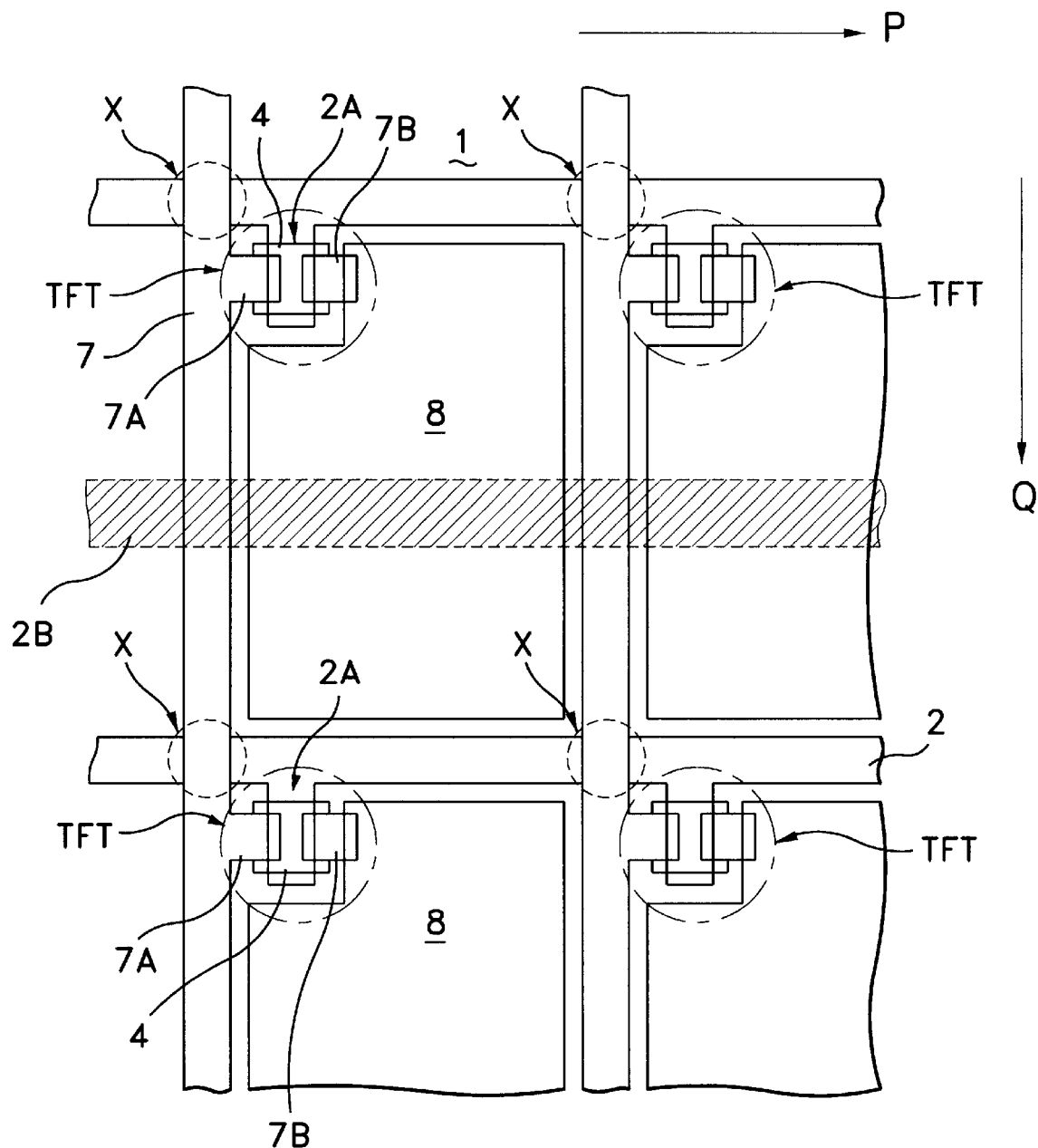
FIG. 1 is a plan view partially showing a lower substrate of a conventional active matrix type liquid crystal display device.
Figure 2:
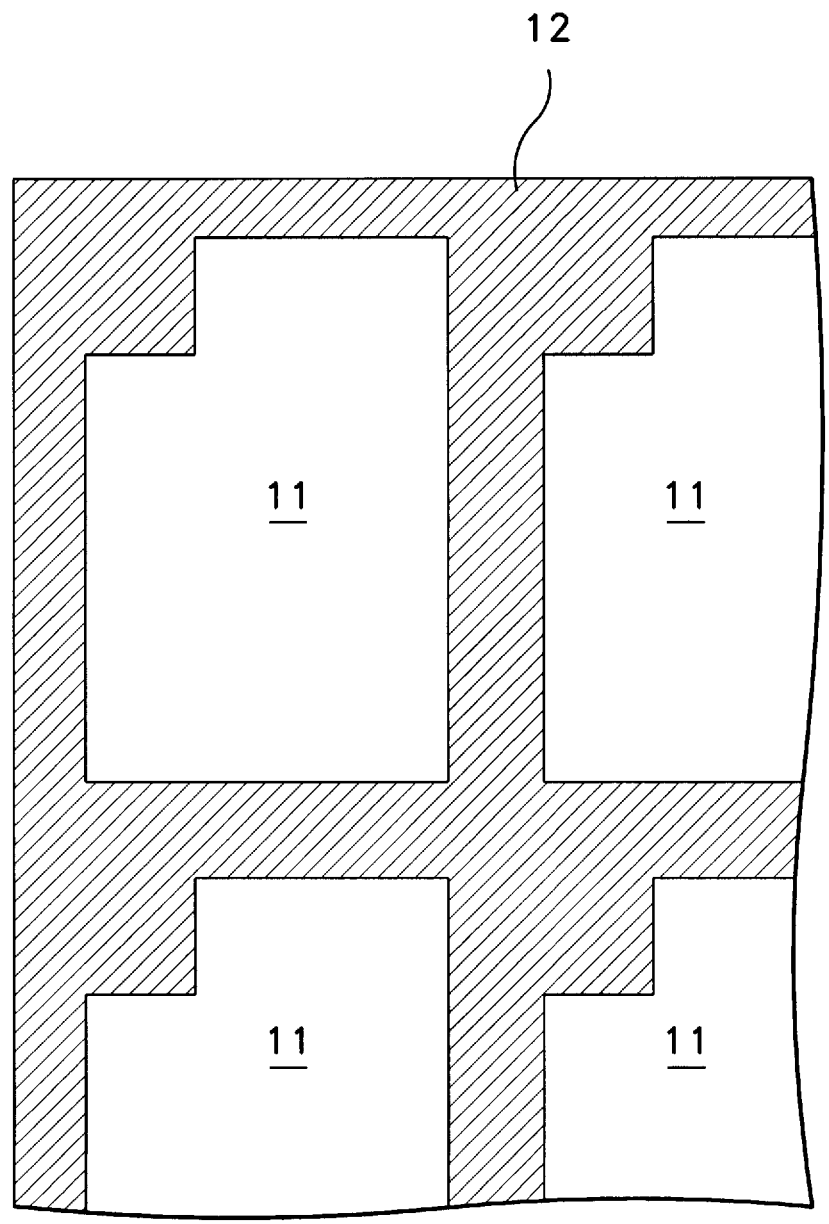
FIG. 2 is a plan view partially showing an upper substrate of a conventional active matrix type liquid crystal display device.
Figure 3:
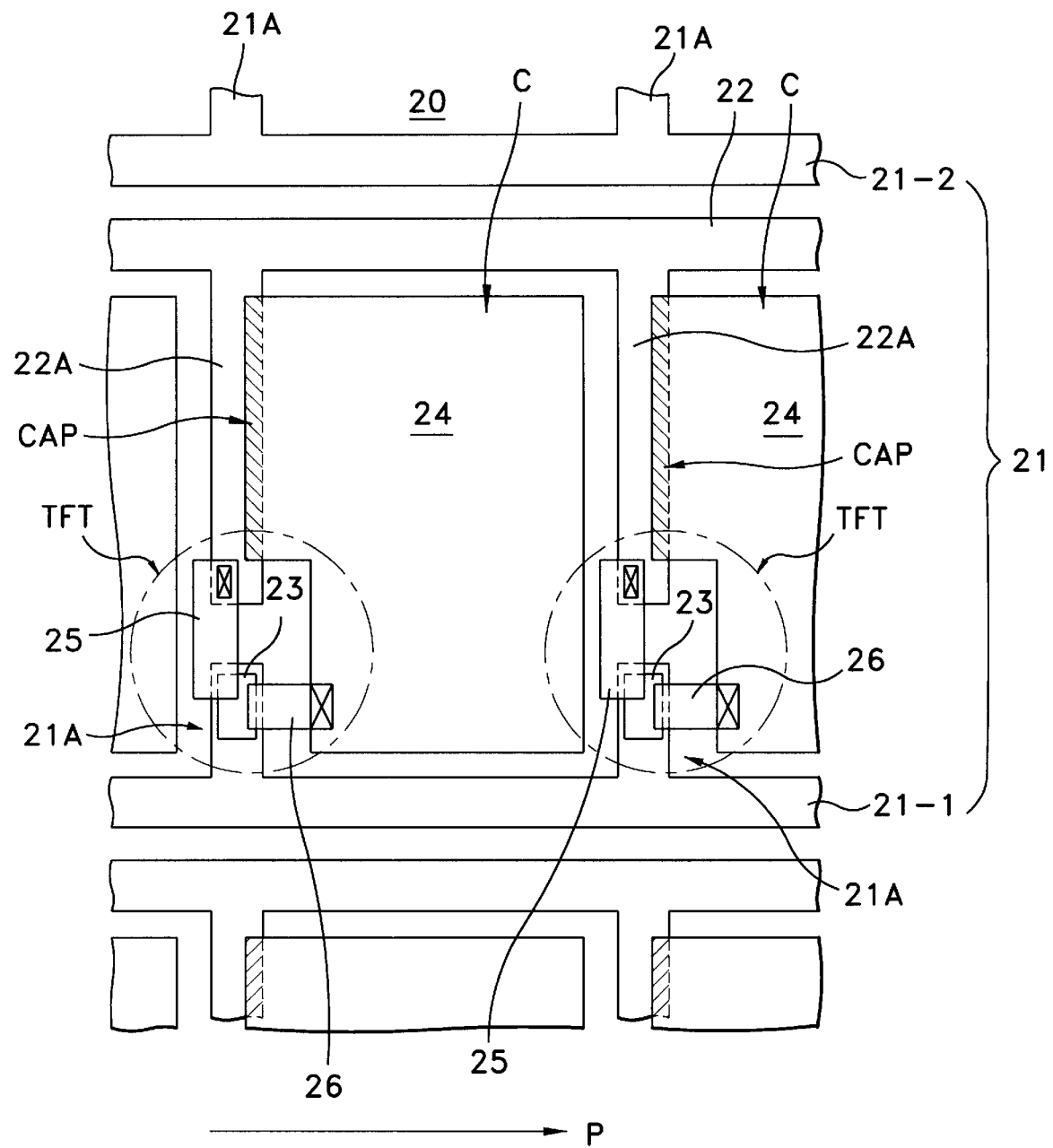
FIG. 3 is a plan view partially showing a lower substrate of a liquid crystal display device according to the present invention.
Figure 4:
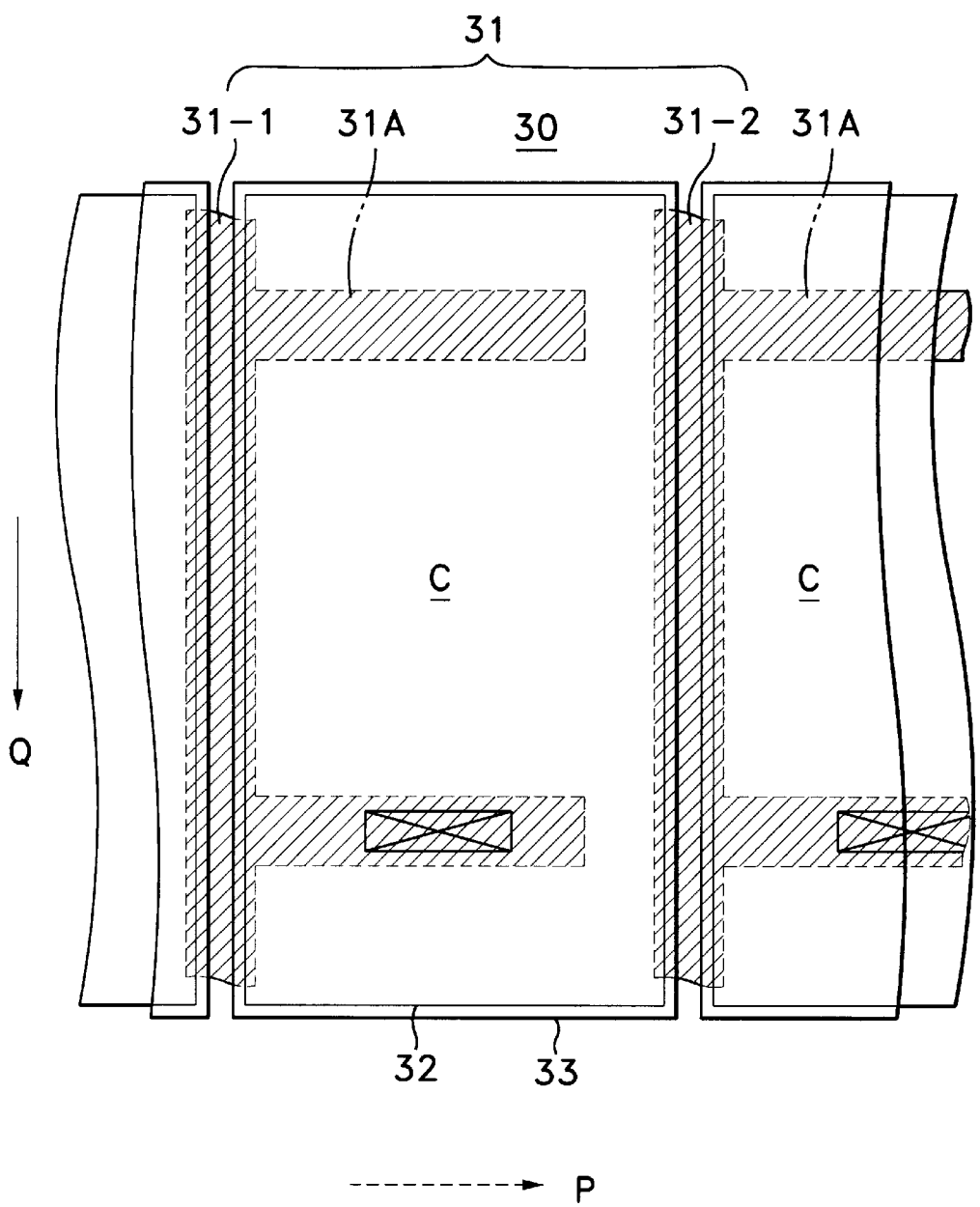
FIG. 4 is a plan view partially showing an upper substrate of a liquid crystal display device according to the present invention.

FIG. 3 is a plan view partially showing a lower substrate of a liquid crystal display device according to the present invention, and FIG. 4 is a plan view partially showing an upper substrate of a liquid crystal display device according to the present invention. To prevent short circuit at the intersections of gate lines and data lines, data lines are formed on an upper substrate. As illustrated in FIG. 3, a pair of gate bus lines 21-1, 21-2 are formed on the lower substrate 20, in a first direction P parallel to and are separated by a predetermined distance from each other. Gate electrodes 21A are a part of their respective gate bus lines 21 and protruded in a perpendicular direction to the gate bus lines 21. The gate bus lines 21 are made of an opaque metal, for example, Al, Ta, Ti, Mo, or Cr. Common electrodes 22 are formed in respective spaces between the gate bus lines 21-1, 21-2, parallel to the same. In this regard, the common electrodes 22 are separated with a predetermined distance from the gate bus line 21-1 defining the unit cell whereas the common electrode 22 is adjacent to the gate bus line 21-2 defining another unit cell. All the common electrodes 22 in the unit cells are connected with each other. Storage electrodes 22A protrude from its corresponding common electrodes 22 toward its corresponding gate electrode 21A, and are perpendicular to the common electrodes 22 and the gate bus lines 21-1, 21-2. Unit liquid crystal cells C are defined by their respective surrounded spaces formed by the respective gate bus lines 21, gate electrodes 21A, common electrodes 22, and storage electrodes 22A. An amorphous silicon layer 23 that serves as a channel is formed on top of the gate electrode 21A.

Each of pixel electrodes 24 are arranged every unit liquid crystal cell C, and overlaps with its corresponding storage electrode 22A at a predetermined part. The gate bus lines 21 and the common electrodes 22 are formed on the lower substrate 20, and the gate bus lines 21, the common electrodes 22 and the pixel electrodes 24 are all electrically insulated by a gate insulation film interposed between them. The overlapping parts CAP of the storage electrodes 22A and the pixel electrodes 24 act as a storage capacitor for continuously driving liquid crystal molecules until a next cell selecting signal is applied to the liquid crystal display device.

Each of a source electrodes 25 contacts with the corresponding respective storage electrodes 22A and overlaps with one side of the corresponding respective amorphous silicon layers 23. Hence, since the source electrodes 25 contact with the storage electrode 22A which are integral with the common electrodes 22, common electrode voltage is applied to the source electrodes 25.

Drain electrodes 26 contact with the pixel electrodes 24 and overlap with the other side of the amorphous silicon layers 23.

A detailed description on the upper substrate is given below with reference to FIG. 4. A plurality of data bus lines 31 are arranged on the upper substrate 30 parallel to each other in the second direction Q which is perpendicular to the gate bus lines 21 formed on the lower substrate 20. The data bus lines 31 are preferably arranged to face their corresponding storage electrodes 22A formed on the lower substrate 20. Also, the data bus lines 31 are arranged parallel to and separated from each other by a predetermined distance, and each of the data bus line 31 comprises a protruded portion 31A extended in a perpendicular direction to the data bus lines 31. The protruded portions 31A are integral with the data bus lines 31, separated from the adjacent data bus line 31-2, and define each of unit cells C. These protruded portions 31A are arranged so that they face the gate bus lines 21 or the common electrodes 22. The data bus lines 31 and the protruded portions 31A can be made of a non-transparent metal, for example, Cr, Al, Ta, or Ti. The data bus lines 31 and the protruded portions 31A act as black matrixes which block light introduced from the lower substrate 20. Once the data bus lines 31 are formed on the upper substrate 30, the gate bus lines 21 and storage electrodes 22A are electrically insulated with liquid crystal layer(not shown) interposed between the upper and lower substrates 20, 30. Hence, danger of short circuit is obviated. Moreover, even if the gate bus lines 21, and storage electrodes 22A and the data bus lines 31 intersect with each other, parasitic capacitance is infinitesimal since there is a thick liquid crystal layer(not shown) interposed between them.

Color filters 32 are formed on the upper substrates above the data bus lines (31) and are arranged to overlap with the edges of a pair of adjacent data bus lines 31-1, 31-2. Transparent electrodes 33 are formed on top of the color filters 32 in a stripe shape. Also, the transparent electrodes 33 are formed to comprise the area between the parallel data bus lines 31-1, 31-2 and their edges. Also, the width of the transparent electrodes 33 may be larger than that of the color filters 32. The transparent electrodes 33 contact with one of protrude portions 31A of the underlying data bus lines 31, and are controlled by the data bus lines 31.

In the liquid crystal display as described above, a predetermined image signal is introduced into data bus lines 31 while selecting a gate bus line among a plurality of gate bus lines 21. Then, every thin film transistor TFT connected to the selected gate bus line 21 are turned on, and voltage from the common electrodes 22 is applied to the respective pixel electrodes 24 connected to the thin film transistors TFT. Hence, voltage from the common electrodes which is different from that of the data bus lines are introduced to the pixel electrodes 24 corresponding to the selected row.

Meanwhile, an image signal voltage is applied to the transparent electrodes 33 being in contact with the data bus lines 31 to which an image signal is applied. More specifically, an image signal voltage is applied to the transparent electrodes 33 corresponding to the selected column.

Then, at unit cells where the gate bus lines 21 and the data bus lines 31 are intersected, a difference in the voltage between the transparent electrode 33 to which image signal voltage is applied and the pixel electrode 24 to which the ground voltage is applied, results in a formation of an electric field.

Hence, according to this electric field, liquid crystal molecules interposed between the upper and lower substrates 20, 30 are activated in an uniform direction, thereby transmitting or blocking light.

In according with the present invention as described above, as the data bus lines 31 are formed on the upper substrate 30, short circuit between the gate bus lines 20 and the data bus lines 31 is prevented.

Also, even if the gate bus lines 21 and data bus line 31, and the storage electrodes 22A and data bus lines 31 intersect with each other, since there is a thick liquid crystal layer (not shown) interposed between them, parasitic capacitance is infinitesimal, thereby reducing signal delay period.

Moreover, since the storage electrodes which are used to block optical transmittance in the prior art are arranged at the borderlines of the unit cells, aperture ratio of the liquid crystal display device is enhanced.

Also, since the data bus lines 31 formed on the upper substrate 30 act as black matrixes which block light leakage from the lower substrate, cost is reduced.

Various modifications not departing from the technical principles and spirit of the present invention could be apparent to those skilled in the art. Hence the attached claims are not limited to the description given above. The claims include all the inventive and novel elements inherent in the present invention, and all the possible variations those skilled in the art may realize.

What is claimed is:

1. A liquid crystal display device comprising:

a lower substrate;

a plurality of gate bus lines formed on said lower substrate and to which selecting signals are applied parallel to each other;

a plurality of common electrodes formed on said lower substrate;

a plurality of thin film transistors connected to said gate bus lines and said common electrodes respectively;

a plurality of pixel electrodes formed on said lower substrate and to which voltage signals from said common electrodes are applied in accordance with an action of said thin film transistors;

an upper substrate disposed oppositely to said lower substrate;

a plurality of data bus lines formed on said upper substrate parallel to each other and to which image signals are applied;

a plurality of color filters formed on said upper substrate above said data bus lines; and a plurality of transparent electrodes arranged on top of said color filters such that they are in contact with said data bus lines.

2. The liquid crystal display device as claimed in claim 1, wherein said gate bus lines and said common electrodes are arranged in a same direction, parallel to each other and said common electrode is disposed between said gate lines.

3. The liquid crystal display device as claimed in claim 1, wherein said common electrodes comprise a plurality of storage electrodes protruded therefrom in a perpendicular direction thereto.

4. The liquid crystal display device as claimed in claim 3, wherein each of said pixel electrodes is arranged to be overlapped with a corresponding one of the storage electrodes at a selected part.

5. The liquid crystal display device as claimed in claim 3, wherein said data bus lines and said storage electrodes are arranged to face to each other.

6. The liquid crystal display device as claimed in claim 1, wherein said data bus lines are arranged in a direction perpendicular to said gate bus lines.

7. The liquid crystal display device as claimed in claim 1, wherein said data bus lines each comprises a plurality of protruded portions extended in along a same direction as said gate bus lines or said common electrodes formed on said lower substrate.

8. The liquid crystal display device as claimed in claim 7, wherein said protruded portions of said data bus lines are in contact with said transparent electrodes.

9. The liquid crystal display device as claimed in claim 1, wherein each of said transparent electrodes is arranged parallel to said data bus lines so as to be overlapping with both side edges of a pair of data bus lines located adjacent and parallel to each other.

10. The liquid crystal display device as claimed in claim 1, wherein each of said color filters overlaps with both side edges of a pair of data bus lines located adjacent and parallel to each other.

11. The liquid crystal display device as claimed in claim 1, wherein said thin film transistors each comprises:
   a gate electrode protruded with a predetermined length toward a respective one of said common electrodes from a respective one of said gate bus lines;
   an amorphous silicon layer formed on top of said gate electrode;
   a source electrode overlapping with one side of said amorphous silicon layer and being in contact with said respective common electrode; and
   a drain electrode overlapping with the other side of said amorphous silicon layer and being in contact with a respective one of said pixel electrodes.

12. A liquid crystal display device comprising
   a lower substrate;
   a plurality of gate bus lines formed on said lower substrate parallel to each other, and separated from each other by a predetermined distance and to which a cell selecting signal is applied;
   a plurality of common electrodes formed on said lower substrate, and arranged parallel to and between said gate bus lines;
   a plurality of storage electrodes protruded from the common electrodes toward the gate bus lines in parallel to each other, and separated by a predetermined distance from each other, the storage electrodes each being arranged inside every unit cell;
   a plurality of thin film transistors connected with said storage electrodes and said gate bus lines respectively;
   a plurality of pixel electrodes connected to the respective thin film transistors so as to receive voltage signals from said common electrodes, the pixel electrodes being overlapped with a predetermined part of said storage electrodes;
   an upper substrate opposed to said lower substrate; a plurality of data bus lines formed on said upper substrate, and arranged parallel to each other and perpendicularly to said gate bus lines;
   a plurality of color filters formed on said upper substrate above data bus lines; and
   a plurality of transparent electrodes formed on top of said color filters, and being in contact with said data bus lines.

13. The liquid crystal display device as claimed in claim 12, wherein said thin film transistors each comprises:
   a gate electrode protruded with a predetermined length toward a respective one of said common electrodes from a respective one of said gate bus lines;
   an amorphous silicon layer formed on top of said gate electrode;
   a source electrode overlapping with one side of said amorphous silicon layer and being in contact with said respective common electrode; and
   a drain electrode overlapping with the other side of said amorphous silicon layer, and being in contact with a respective one of said pixel electrodes.

14. The liquid crystal display device as claimed in claim 12, wherein said data bus lines and said storage electrodes are arranged to face each other.

15. The liquid crystal display device as claimed in claim 12, wherein said data bus lines each comprises a plurality of protruded portions extended in a same direction as said facing gate bus lines or said common electrodes formed on said lower substrate.

16. The liquid crystal display device as claimed in claim 15, wherein said protruded portions of said data bus lines are in contact with said transparent electrodes.

17. The liquid crystal display device as claimed in claim 16, wherein each of said transparent electrodes is arranged parallel to said data bus lines so as to be overlapping with both side edges of a pair of data bus lines located adjacent and parallel to each other.

18. The liquid crystal display device as claimed in claim 12, wherein each of said color filters overlaps with the both side edges of a pair of data bus lines located adjacent and parallel to each other.

19. A liquid crystal display device comprising a lower substrate;
   a plurality of gate bus lines arranged parallel to and separated from each other by a predetermined distance, formed on said lower substrate, said gate bus lines each having a gate electrode protruded perpendicularly to said gate bus lines to which cell selecting signals are applied;
   a plurality of common electrodes formed on said lower substrate, and arranged parallel to and between said gate bus lines;
   a plurality of storage electrodes protruded parallel toward one side of said gate bus lines from said common electrodes, separated by a predetermined distance from each other, and the storage electrodes each having arranged inside every unit cell;
   a plurality of thin film transistors connected to said gate bus lines and said storage electrodes respectively, the thin film transistors each having said gate electrode, an amorphous silicon layer formed on said gate electrode, a source electrode overlapping with a predetermined part of said amorphous silicon layer and connected with a respective one of said storage electrodes, and a drain electrode connected with another side of said amorphous silicon layer;
   a plurality of pixel electrodes connected to said drain electrode and overlapping with a predetermined part of said storage electrodes;
   an upper substrate opposite said lower substrate;
   a plurality of data bus lines formed on said upper substrate, and arranged perpendicularly to said gate bus lines, said data bus lines each having a protruded portion extended in perpendicular direction to said data bus lines at a location corresponding to the gate bus lines and the common electrodes;
   a plurality of color filters formed on said upper substrate above said data bus lines;
   a plurality of transparent electrodes arranged on top of said color filters, such that each overlaps with both side edges of a pair of data bus lines arranged parallel and adjacent to said transparent electrodes, and connects with one of said protruded portions of said pair of data bus lines.

20. The liquid crystal display as claimed in claim 19, wherein each of said color filters overlaps with both side edges of a pair of data bus lines located adjacent and parallel to each other.

* * * * *